United States Patent [19]

Roentgen et al.

[11] Patent Number: 4,554,199
[45] Date of Patent: Nov. 19, 1985

[54] INNER LAMINA, AND PROCESS FOR MANUFACTURE, FOR VEHICLE WINDSHIELD

[75] Inventors: Paul Roentgen, Roetgen/Rott; Helmut Krumm; Gunter Lenzen, both of Aachen; Heinz Schilde, Wuerselen, all of Fed. Rep. of Germany

[73] Assignee: Saint-Gobain Vitrage, Aubervilliers Cedex, France

[21] Appl. No.: 355,250

[22] Filed: Mar. 5, 1982

[30] Foreign Application Priority Data

Mar. 6, 1981 [FR] France ................................ 81 04499

[51] Int. Cl.[4] ...................... B32B 3/02; B32B 27/30
[52] U.S. Cl. .................................... 428/194; 264/230; 264/289.6; 264/DIG. 71; 264/237; 428/192; 428/437; 526/315; 525/61
[58] Field of Search ............... 428/437, 192, 194, 212; 264/DIG. 71, 288.8, 230, 237, 289.6; 525/61; 526/315

[56] References Cited

U.S. PATENT DOCUMENTS

| | | | |
|---|---|---|---|
| 3,038,208 | 6/1962 | Fujioka | 264/160 |
| 3,067,585 | 12/1962 | Hait | 61/7 |
| 3,341,889 | 9/1967 | Miller | 425/140 |
| 3,370,111 | 2/1968 | Boone | 264/2 |
| 3,591,406 | 7/1971 | Moynihan | 428/437 |
| 3,679,435 | 7/1972 | Klenk et al. | 99/176 |
| 3,696,186 | 10/1972 | Stark et al. | 264/292 |
| 3,872,194 | 3/1975 | Lowry et al. | 264/22 |
| 4,244,997 | 1/1981 | Postupak | 428/194 |

FOREIGN PATENT DOCUMENTS

| | | |
|---|---|---|
| 559782 | 7/1958 | Canada . |
| 1001374 | 12/1976 | Canada . |
| 1127948 | 7/1982 | Canada . |
| 2742897 | 4/1979 | Fed. Rep. of Germany . |
| 1157377 | 5/1958 | France . |
| 2081903 | 12/1971 | France . |
| 2108124 | 5/1972 | France . |
| 2158287 | 8/1973 | France . |
| 1352165 | 5/1974 | United Kingdom . |

Primary Examiner—Ellis P. Robinson
Attorney, Agent, or Firm—Pennie & Edmonds

[57] ABSTRACT

A thermoplastic synthetic high polymer sheet including induced tensile stress lengthwise of the sheet which varies in intensity from a maximum along one edge to a minimum along the other edge. The induced tensile stress is frozen in the sheet by maintaining its temperature below a transformation temperature. Upon elevation of the temperature of the sheet above the transformation temperature, as the process of fabrication of a laminated windshield is to commence, the sheet, without further operative forming operations, will deform to conform substantially to the outline of the outer curved lamina of the windshield. The sheet may include a zone along one edge to provide filtering of glare.

9 Claims, 5 Drawing Figures

INNER LAMINA, AND PROCESS FOR MANUFACTURE, FOR VEHICLE WINDSHIELD

TECHNICAL FIELD

The invention relates to an inner lamina for a windshield laminate, and a process for fabrication of the inner lamina which, when the inner lamina is to be used, is cut in required length from a roll of lamina and subjected to an operative step of relaxation of internal stress whereby the inner lamina is deformed into a curved sheet.

BACKGROUND ART

Vehicle windshields comprise a laminated structure which generally includes a pair of outer sheets of silicate glass and an inner thermoplastic, synthetic, high polymer sheet located therebetween for purposes as are well-known in the automotive arts. Customarily, the plastic material to be used in the fabrication of a windshield is supplied as a "rough" section, that is, a rectangular section which theretofore was cut from an unwound length of a rolled strip. The various lamina, then, are assembled under heat and pressure prior to further processing steps.

Present day windshields generally are of trapezoidal shape, and their parallel bases are curved in a circular manner as a function of the shape of the vehicle with which the windshield is used. Oftentimes, the windshield will include a filtering zone within the region of the upper base for purposes of filtering glare. The filtering zone preferably comprises a strip which extends laterally of the windshield along the length of the upper base and may be formed by tinting or coloring the plastic within that region.

If the filtering zone is to extend in a visually horizontal attitude when the windshield is in place on the vehicle, that is, with the boundary line between the tinted and untinted regions of the windshield parallel to the upper base of the windshield, heretofore indicated as being curved, for any reason, aesthetic or otherwise, such as for example, to comply with a visibility standard, then the plastic material of the "rough" or rectangular section must be shaped so that the boundary line generally follows the curve of the upper base. If the plastic material is not shaped the boundary line will not be parallel to the curve of the upper base.

Several shaping techniques have been resorted to within the prior art. To this end, U.S. Pat. No. 3,341,889 discloses that the plastic material of the "rough" or rectangular section, after it is cut, from an unwound length, is heated to bring it to a desired temperature, and, then, the section of plastic material is deformed by exerting unequal forces on the same.

German Offenlegungsschrift No. 27 42 897 discloses another technique for shaping a plastic material for use in a windshield having upper and lower curved bases. The German publication discloses that the plastic material in the form of a strip, brought to and maintained at the deformation temperature, is wound on a conical drum. The winding operation is carried out while subjecting the plastic material to stress. The conical surface of the drum is indicated as providing the plastic material with a desired curvature.

U.S. Pat. No. 3,038,208 represents a further example of the prior art. This patent discloses the transport of a continuous strip of plastic material to and through a zone of heating, heating of a region of the plastic material, and thereafter, drawing the heated plastic material to a state of permanent deformation.

The prior art, set out above, is considered to suffer from various problems and disadvantages. For example, the technique described in the first-mentioned patent is practiced on individual rectangular sections and, consequently, is considered to be uneconomical. The process of the German publication is considered to suffer from a requirement of use of specifically contoured conical drums or mandels which ultimately result in difficulties in storage and shipping of plastic material on the conical mandrel, and a lack of universality of operation. Thus, while the process may be carried out continuously, because of difference in the width dimension between the long edges of the windshield and the required curvature to be obtained, the process requires the use of conical mandrels whose end diameters must differ as a function of the desired degree of curvature. The last-mentioned patent overcomes those difficulties relating to the storage and shipping of plastic material on conical mandrels, but suffers from problems which reside in the completion of the overall process whereby the plastic material, once it is deformed, is immediately cut into sections of desired length. These deformed sections are more difficult to handle, store and ship, which difficulties add to the expense of fabrication.

SUMMARY OF THE INVENTION

The invention seeks to overcome the problems and disadvantages of the prior art by providing a continuous strip of plastic material as a supply of inner lamina for use in a laminated vehicle windshield, which may be stored and shipped in a manner wound on a cylindrical spindle, and which supply will provide a source for inner lamina in a form substantially corresponding to that of the outer lamina following transformation of the "rough" section cut from the continuous strip without an additional shaping operation.

The continuous strip of plastic material is provided with internal tensile stress, the value of which increases progressively from a value which is essentially zero at one edge of the continuous strip to a maximum value crosswise, that is, laterally across the continuous strip. The value of internal tensile stress laterally across the continuous strip, therefore, will be at a level whereby after cutting the "rough" section from the continuous strip, and transformation of the "rough" section through relaxation of the internal tensile stress under heat at a desired temperature, the "rough" section will substantially accommodate to the outline of the outer lamina. The transformation and accommodation is carried out without necessity of outside shaping forces.

The continuous strip according to the present invention is subjected to a drawing operation, and particularly a drawing operation during which areas crosswise of the continuous strip undergo a desired elastic elongation whereby a plastic deformation of the "rough" section ultimately will result in the aforementioned transformation and accommodation. The drawing operation, thus, will be such that areas crosswise of the "rough" section undergo progressively greater plastic deformation.

The elastically elongated continuous strip is maintained in a rectilinear disposition by reducing the temperature of the continuous strip to a temperature below that at which the internal tensile stresses are capable of relaxation. Preferably, the reduction in temperature thereby, in effect, to "freeze" the elastic deformation is carried out immediately after elastic elongation by rapid, uniform cooling. The continuous strip is maintained at that temperature thereby to function as a supply or source of inner lamina to undergo transformation at a later time. It is contemplated, however, that the continuous strip may be cut to "rough" sections; although it is preferred to store the continuous strip on a cylindrical spindle, rather than to store "rough" sections on a stack.

The invention lends itself, particularly, to providing a continuous strip of plastic material having a tinted or colored zone for filtering glare located within the region of an edge for use in a laminated windshield.

The invention provides for cost saving in product since the "rough" sections substantially accommodate to the trapezoidal design of present day vehicle windshields without substantial waste, and the process is one that permits, assuming a maintenance of temperature, storage of either the continuous strip or "rough" sections cut from the continuous strip during extended periods of time without any deleterious effect on the internal tensile stress within the plastic material.

BEST MODE FOR CARRYING OUT THE INVENTION

Figure 1:
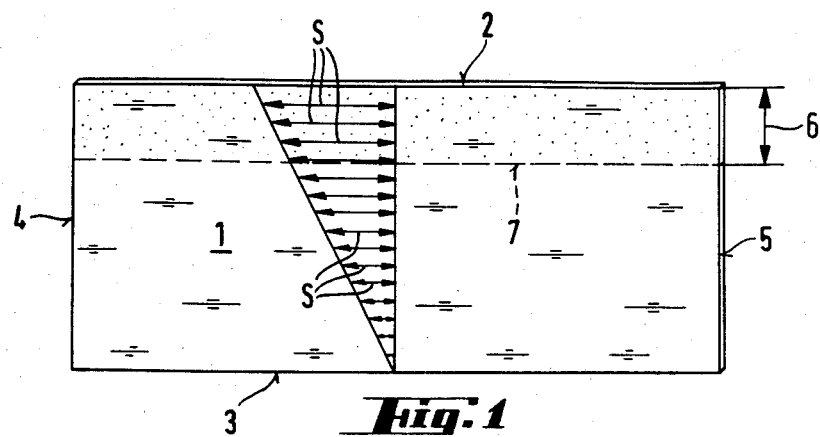
FIG. 1 is a view substantially in elevation of a sheet for use as an inner lamina of a laminated windshield illustrating the orientation of internal tensile forces.

A cut section on inner lamina for use in the manufacture of a vehicle windshield of laminated construction is illustrated in FIG. 1. The inner lamina is represented by a sheet 1 (the "rough" section hereinbefore referred to) of overall rectangular outline including a pair of edges 2, 3 along its major dimension and a pair of edges 4, 5 along its minor dimension. The sheet consists of a thermoplastic plastic material, such as polyvinyl butyral containing about 15 to 30% by weight plasticizer which currently is used in a manufacture as previously set out.

Preferably, the sheet 1 is cut from a continuous strip and, in many instances, a tinted or colored zone for filtering glare is located within the region of an edge and along the major dimension of the sheet. The tinted or colored zone 6 is illustrated in FIG. 1 between edge 2 and a boundary line 7 which extends parallel to the edge.

In a manner to be discussed below, the continuous strip is provided with internal tensile stress, the pattern of which may be seen in FIG. 1. As illustrated, the internal tensile stress, exerted along the major dimension of the sheet, is diagrammatically represented by a series of arrows S. Thus, the pattern illustrates a traction internal to the section 1 whose value is essentially zero in the immediate vicinity of edge 3, a value which constantly increases across the width of the section, and a value which is a maximum in the immediate vicinity of edge 2. The internal tensile stresses within the plastic material remain quiescent, and there is no exertion of force resulting in molecular movement of the plastic material so long as and during the length of time that the section, and the continuous strip from which it is cut, is maintained at a temperature less than the temperature at which there is an ability of relaxation of the internal tensile stress. Thus, the strip will maintain its overall rectangular outline, and the sheet 1 which may be cut from the continuous strip will likewise maintain its rectangular outline to enhance stacking, shipping, and the like. Further, it is contemplated that the continuous strip may be stored and shipped in a disposition wound on a cylindrical spindle. Typically, a separation medium, such as an interlayer or a sprinkling of bicarbonate of soda, or the like, will be located between the several wraps.

Figure 2:
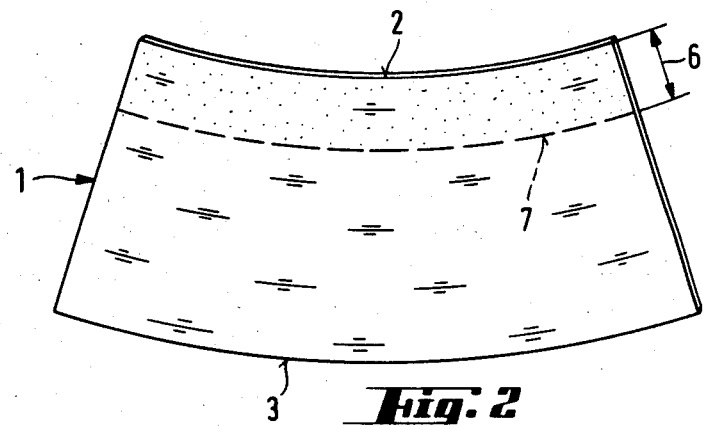
FIG. 2 is a view similar to FIG. 1, illustrating the sheet following removal of the tensile forces.

FIG. 2 illustrates sheet 1 after the temperature is raised to at least the stress relaxing temperature of the plastic material and deformation from the outline of FIG. 1 has occurred. To this end, the sheet shortens unequally under the effect of the stresses which are proportionately relaxed. Shortening of the sheet corresponds to the rate of stress. Therefore, maximum shortening occurs along edge 2, while the length of edge 3 remains substantially unchanged. Following relaxation of the internal tensile stress, boundary line 7 of the tinted or colored zone 6 follows a circular path substantially concentric to the circular paths of edges 2, 3.

An average radius of curvature for many present day windshields (an upper edge) may be on the order of 100 cm. Therefore, the crosswise values of internal tensile stress when the plastic material is allowed to plastically deform must provide at least that measure of deformation from the FIG. 1 to the FIG. 2 outline. However, the radius of curvature along the upper edge is not the same for all models and makes of vehicles. To the end that a section 1 is to accommodate to a windshield of a certain model and make, and particularly if the windshield presents a tinted or colored zone 6 comprising a filter of progressive density parallel to the upper edge, then internal tensile stress of different intensities are to be established during the process of elastic elongation. The intensity levels may be established for various uses by modifying the rate of drawing and the induced tensile stress by regulation of the forces from traction exerted in the drawing area and the temperature of the plastic material during the drawing operation.

Figure 4:
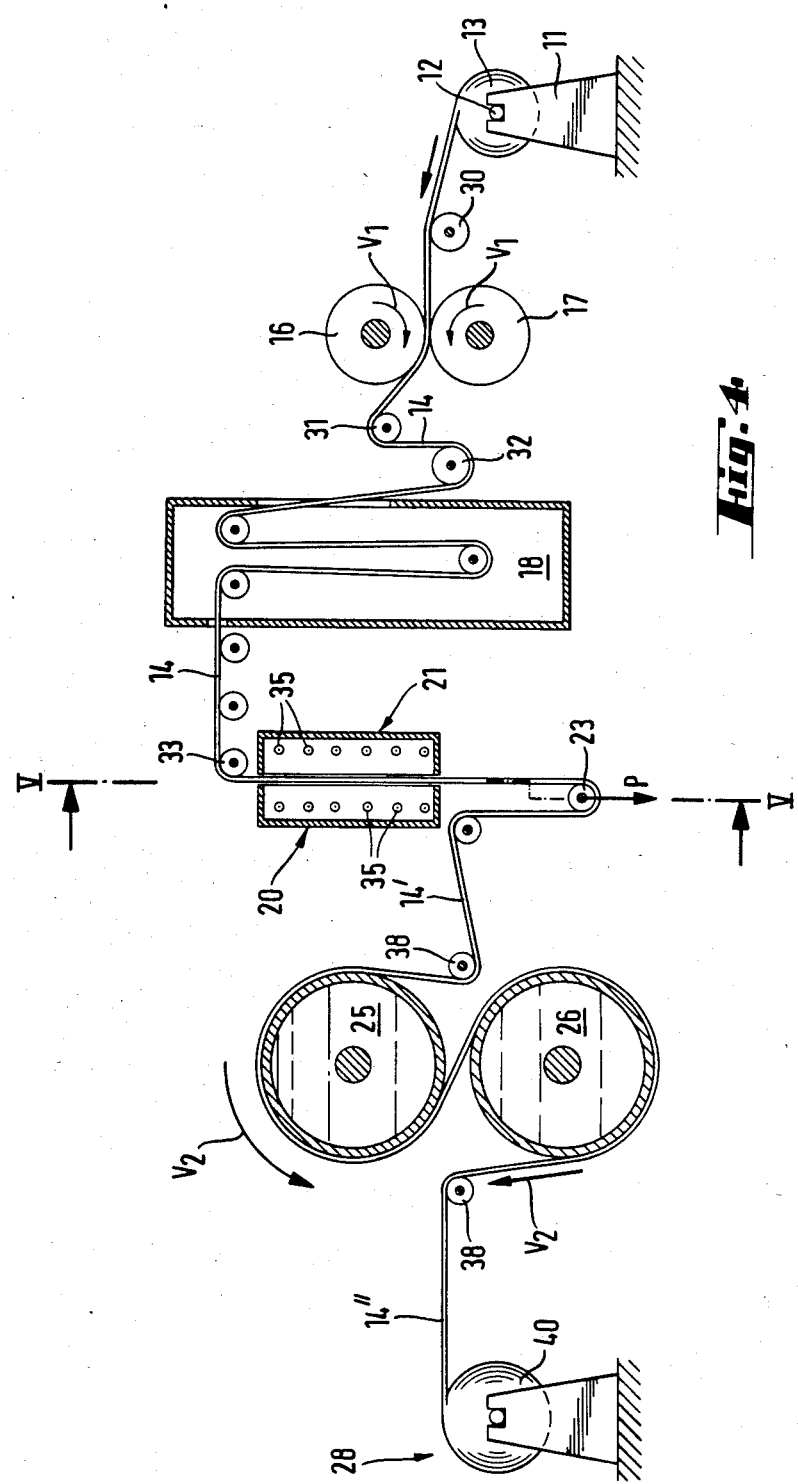
FIG. 4 is a diagrammatic representation of apparatus for imparting tensile stress to a strip from which the sheet for use as an inner lamina is cut.
Figure 5:
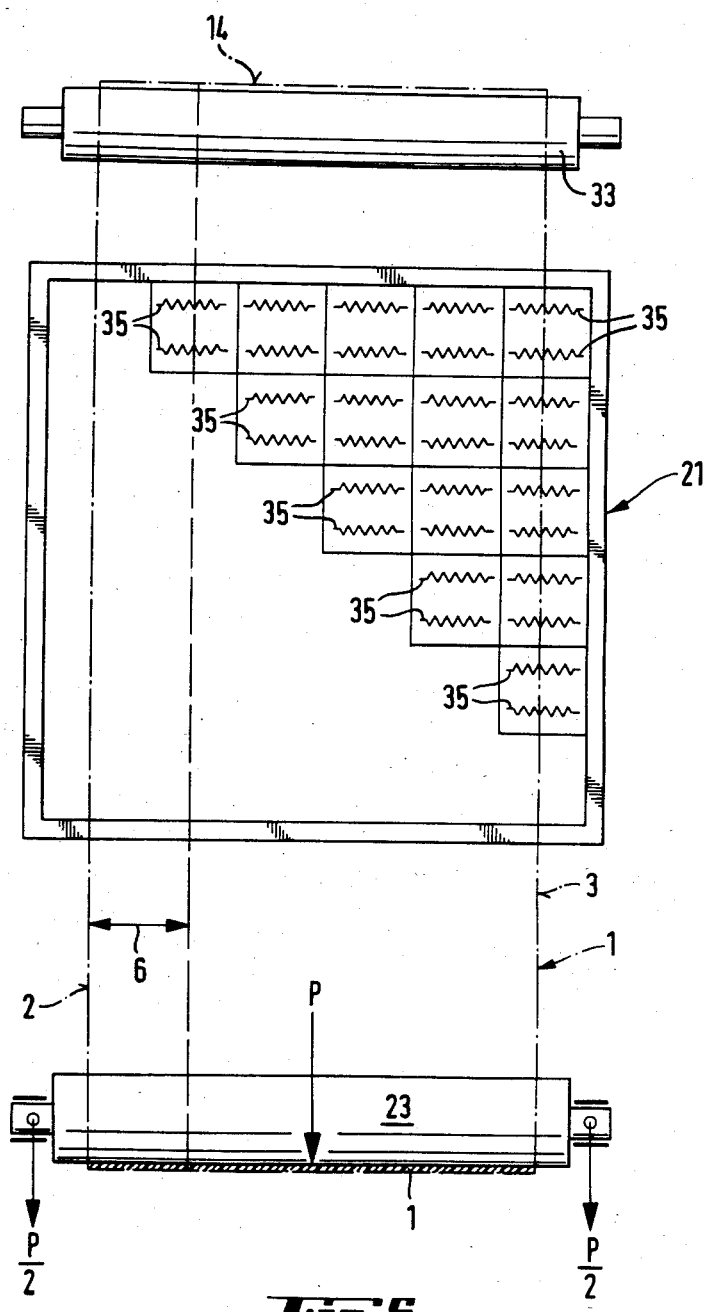
FIG. 5 is a view as seen along the line V—V in FIG. 4.

The operative technique by description of the apparatus all become clearer during the discussion appertaining to FIGS. 4 and 5.

A parameter in the successful implementation of the invention is that of the stress relaxing temperature of the plastic material of the continuous strip. This involves the average temperature, T, of the freezing range of the plastic material reaching a vitreous or substantially vitreous state at which, on a microscopic scale, the Brownian movement of elementary constituents of the molecular chains is frozen. The average temperature T referred to as the temperature of transformation or the temperature of passage to the vitreous state. The distribution of the previously created lacunae is frozen so that internal reorganizations and deformations accompanied by existing elastic stress are not possible at temperatures within or below the freezing range, yet the impediment is removed or will disappear as the temperature exceeds the freezing range.

Since a series of physical properties are modified when the temperature exceeds the freezing range, it is possible to determine these properties with a good degree of precision by observation of the dynamic traction modulus, G, or the mechanical loss factor, d, as they evolve. The evolution of these factors as a function of temperature t, may be seen in FIG. 3.

Figure 3:
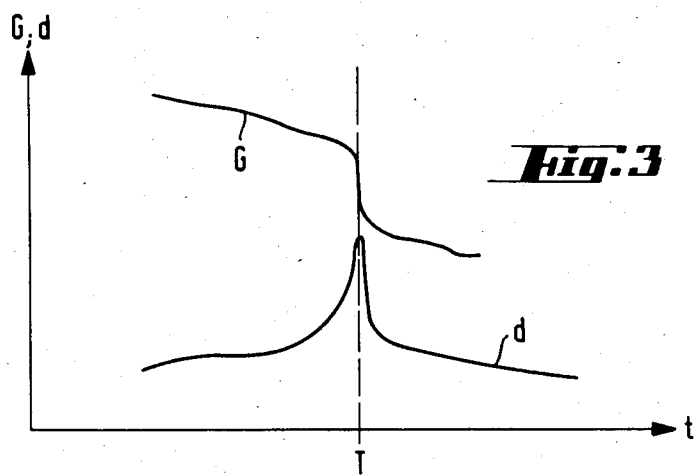
FIG. 3 is a diagram representing certain mechanical properties, such as dynamic traction modulus (G) and mechanical loss factor (d), as a function of temperature (t)

Referring to FIG. 3, it will be observed that there is a relatively narrow range, which is on the order of 5° C. (the average being identified by T), within which the dynamic traction modulus drops suddenly while the mechanical loss factor exhibits a sudden maximum as temperature increases. These magnitudes may be determined by a torsion pendulum test according to standard DIN 53445.

According to the torsion pendulum test the temperature range for a standard type polyvinyl butyral containing 30% by weight plasticizer is 285 to 291 K which corresponds to a temperature T of transformation of 288 K. A standard type polyvinyl butyral containing 24% by weight plasticizer has a temperature range of 290 to 296 K., and a temperature of transformation of 293 K. If the temperature of transformation for the particular plastic material is exceeded by about 5° to 10° C., then it may be assured that the internal tensile stress is frozen.

Referring to FIG. 4, plastic material, as a continuous strip 14, is payed out from a roll 13 and moved from an upstream station to a downstream station at which the process-stressed continuous strip 14" is rewound to form roll 40. The roll 13 of the unprocessed continuous strip is supported on a spindle 12 which, in turn, is supported by a cradle 11 permitting free rotational movement of the roll, while the roll 40 may be similarly supported by a rewinder 28.

A train of unwinding rollers including at least a pair of rollers 16, 17 are provided for drawing the continuous strip 14 from roll 13. As may be seen, the continuous strip passes through the nip of the rollers moving at a constant peripheral speed thereby to be imparted forward movement at a speed V1. One or more rollers 30 may be provided both to guide and support the continuous strip between the roll 13 and the nip of rollers 16, 17.

The rollers 30, and the rollers 31, 32, 33 and 38 discussed below, may be keyed or otherwise conventionally supported on a spindle for free movement in their guiding and supporting function. The structure for mounting the several spindles (not shown) upon which the rollers are supported may be considered conventional.

An air conditioning chamber 18 which is conventional is located downstream of the drive rollers 16, 17 and a heating unit is located downstream of the air conditioning chamber 18. The rollers 31, 32 and 33 may be provided to reverse and lengthen the path of the continuous strip 14 and to align the continuous strip for entry into both the air conditioning chamber and the heating unit. The continuous strip 14 is adjusted in moisture content within the air conditioning chamber.

The heating unit includes a pair of open boxes 20, 21 located to provide an opening into an internal chamber at the top and an exit from the chamber at the bottom. A vertical orientation of the heating unit is preferred for reason that the continuous strip 14 need not be supported as may be required for horizontal transit through the zone of heating. Typically, the heating unit will be insulated for purposes of conservation of energy and to provide better regulation of the heat output, as may be desired for a particular process treatment.

The continuous strip 14 is subjected to a heterogeneous heating pattern crosswise of the path of movement so that the temperature is at a maximum value along one edge, decreasing substantially linearly to a minimum value along the opposed edge. Referring to FIG. 5, the temperature is at a maximum value along right-hand edge (edge 3 of sheet 1 in FIG. 1), and at a minimum value, no more than about ambient temperature, along the left-hand edge (the edge 2 of sheet 1 in FIG. 1).

A plurality of heat sources in the form of radiators 35 are located within the internal chamber, on both sides of the continuous strip, to provide the desired temperature profile across the width of the continuous strip.

Referring again to FIG. 5, the radiators are arranged one above the other and in a number horizontally from the right-hand to left-hand edges which decreases in the direction of advance of the continuous strip. The radiators may be regulated individually, that is, they may be turned on, off and adjusted, thereby to provide a degree of precision in the levels of operating temperature.

The zone of the continuous strip 14 having undergone heterogeneous heating is elongated, partly plastically and partly elastically by traction. Traction is exerted by a compensating roller 23 under the effect of its adjustable weight, the resultant of which is indicated by the force P. The force is uniformly applied on both sides of the continuous strip as well as the segment 14' of the continuous strip downstream of the compensating roller.

The compensating roller 23 is guided by any means as may be conventional, and elongation may vary between 1.1 and 1.4 depending upon the temperature of the plastic material of continuous strip 14 and the force P. For this reason, drums 25, 26 and rewinder 28 have a constant peripheral speed V2 which is about 10 to 40% greater than the unwinding speed V1 as imparted to the continuous strip by rollers 16, 17. Suitable means (not shown) providing prime mover capability are connected to for driving each of the rollers, drums and rewinder.

The roller 38 and one or more additional rollers disposed between the roller 38 and compensating roller 23 locate and support the path movement of segment 14' of continuous strip 14. Particularly, the roller 38 locates the segment 14' so that it follows substantially most of the surface area of drum 25. A further roller 38, downstream of drum 25, and drum 26, locates the segment 14" so that it follows substantially most of the surface area of drum 26.

The drums 25, 26 are located one above the other so that the continuous strip 14 follows an S-path during movement. Drums 25, 26 are cooling drums and function through surface-to-surface contact with the continuous strip 14 to reduce the temperature of the continuous strip to about 10° C. below the stress relaxing temperature T. The surface-to-surface contact and the successive winding of the continuous strip along the described path serves to cool the continuous strip both rapidly and uniformly. The cooling drums 25, 26 may be disposed in a cooled enclosure (not shown).

The continuous strip 14, as previously indicated, is guided by the roller 38 downstream of the cooling drums and the continuous strip imparted the heterogeneous, frozen traction stresses is rolled on a cylindrical hub or drum by rewinder 28. The roll 40 will be maintained at a temperature below the transformation until such time as use is desired. When a "rough" section is to be used in the manufacture of a windshield, it may be cut from the continuous strip on roll 40 and brought to a temperature above the transformation temperature. The particular level of temperature will determine the period of time for the "rough" section, the previously described sheet 1, to deform from the FIG. 1 outline to the FIG. 2 outline. Generally, the sheet will assume its final curved outline in the space of a few hours.

The following operative parameters may be followed in the process-stressing of plastic material whose final curved shape is in an arc of a circle, with the radius of curvature of the boundary line 7 of the tinted or colored zone 6 being about 230 cm.

The continuous strip 14 is formed of polyvinyl butyral containing 28% by weight plasticizer, 73 cm in width and 0.76 mm in thickness. The tinted or colored zone 6 is 20 cm wide.

Rollers 16, 17 serve to unwind the continuous strip from roll 13 at a speed of 7.5 m/min. The radiators 35 are positioned at a distance 50 mm from each side of the continuous strip in the pattern of FIG. 5. The radiators have a surface temperature of 420° C. at the exit from the internal chamber and the continuous strip has a temperature profile of 50° C. on the edge of the continuous strip including the tinted or colored zone and 2 cm from the edge, 80° C. in the middle and on the opposite side, and 160° C. on the opposite edge and 2 cm from that edge.

Compensating roller 23 weighs 11 kg and provides an average traction of 2 daN/cm$^2$ in the segment 14' of the continuous sheet. The speed of movement of the cooling drums 25, 26 is regulated to an extent by compensating roller 23. Particularly, the speed of movement of cooling drums 25, 26 is accelerated as the compensating roller descends and decelerated as the compensating roller ascends. The average peripheral speed of the cooling drums under the stated condition is 10.2 m/min.

The continuous strip is elongated under the effect of traction by 36%, and the width dimension is reduced to 62 cm at the exit from the internal chamber.

The continuous strip is cooled by the effect of cooling provided by cooling drums 25, 26 whose surface temperature is controlled or regulated to 5° C. The frozen continuous strip, then, is wound in roll 40 and stored at a temperature on the order of 10° C.

The continuous strip wound on roll 40 was stored for two months at 10° C., at which time "rough" sections having a length of 180 cm were cut from the continuous strip. The "rough" sections were heated to a temperature of about 22° C. After about forty-eight (48) hours the "rough" sections had formed to the circular shape of FIG. 2. The length of the "rough" section along the edge 2 returned to the length prior to drawing. The drawing operation along and within the region of the edge 2, thus, corresponds to a purely elastic deformation. There was no appreciable shortening along and within the region of the edge 3 after the relaxation of stress. A plastic deformation occurred along that edge. The radius of curvature along the boundary line 7 was 230 cm, corresponding substantially to the curvature desired for a large number of present-day windshields.

We claim:

1. A sheet of plastic material in extending rectilinear disposition and rectangular in outline for use in fabricating inner lamina of a laminated windshield, said sheet in the rectilinear direction being subjected to internal tensile stress which varies in intensity crosswise of said sheet, said internal tensile stress being frozen in said sheet whereby when the temperature of said sheet is raised to a temperature above a transformation temperature and there is a relaxation in said internal tensile stress said sheet deforms from said extending rectilinear disposition into a simple curved sheet.

2. The sheet claim 1 wherein said internal tensile stress varies regularly from a maximum intensity along one edge to a minimum intensity along the opposed edge.

3. The sheet of claim 1 wherein said plastic material is a thermoplastic synthetic high polymer having a transformation temperature below ambient temperature, and wherein said sheet is maintained at a temperature below the transformation temperature.

4. The sheet of claim 3 wherein said plastic material is polyvinyl butyral containing 15 to 30% by weight plasticizer, and wherein the transformation temperature is about 285 to about 305 K.

5. The sheet of any one of claims 1, 2, 3 or 4 further comprising a zone for filtering glare extending along one edge.

6. The sheet of claim 5 wherein said zone for filtering glare extends along the edge wherein said internal tensile stress is at a maximum.

7. A process of forming a sheet for use in fabricating inner lamina of a laminated windshield comprising elevating the temperature of the sheet in extending rectilinear disposition and rectangular outline crosswise in a manner that the temperature profile increases from one edge of the sheet toward the other edge, substantially simultaneously subjecting the sheet in extending rectilinear disposition to drawing whereby said sheet undergoes elongation up to about 40%, and, while the sheet is subject to induced tensile stress in an area of elastic deformation, rapidly cooling the sheet to a temperature below a transformation temperature to maintain the sheet in said extending rectilinear disposition and freeze the induced tensile stress in place.

8. The process of claim 7 wherein the induced tensile stress results from elastic drawing in areas corresponding to maximum stress.

9. The process of claim 7 wherein said sheet is a continuous sheet, and including rolling said rapidly cooled sheet in a cylindrical roll for storage.

* * * * *